US011196094B2

United States Patent
Yun

(10) Patent No.: US 11,196,094 B2
(45) Date of Patent: Dec. 7, 2021

(54) SECONDARY BATTERY

(71) Applicant: Samsung SDI Co., Ltd., Yongin-si (KR)

(72) Inventor: Youngkwang Yun, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 274 days.

(21) Appl. No.: 15/277,222

(22) Filed: Sep. 27, 2016

(65) Prior Publication Data

US 2017/0092991 A1     Mar. 30, 2017

(30) Foreign Application Priority Data

Sep. 30, 2015  (KR) .................. 10-2015-0138006

(51) Int. Cl.
| | | |
|---|---|---|
| *H01M 10/42* | (2006.01) | |
| *H01M 10/04* | (2006.01) | |
| *H01M 2/02* | (2006.01) | |
| *H01M 50/10* | (2021.01) | |
| *H01M 50/543* | (2021.01) | |
| *H01M 10/48* | (2006.01) | |

(52) U.S. Cl.
CPC ....... *H01M 10/425* (2013.01); *H01M 10/486* (2013.01); *H01M 50/10* (2021.01); *H01M 50/543* (2021.01); *H01M 2220/20* (2013.01); *H01M 2220/30* (2013.01)

(58) Field of Classification Search
CPC ............. H01M 10/04; H01M 10/0425; H01M 10/486; H01M 2/0202; H01M 2/024; H01M 2/30
See application file for complete search history.

(56) References Cited

U.S. PATENT DOCUMENTS

| | | | | |
|---|---|---|---|---|
| 2003/0054241 A1* | 3/2003 | Yamashita | ............. | H01M 2/06 429/181 |
| 2012/0219847 A1 | 8/2012 | Hong et al. | | |
| 2013/0052512 A1* | 2/2013 | Moriuchi | ............ | H01M 2/0207 429/158 |
| 2013/0149561 A1* | 6/2013 | Hong | ..................... | H01M 2/06 429/7 |
| 2014/0037995 A1* | 2/2014 | Lee | .................. | H01M 10/4257 429/7 |
| 2014/0050959 A1 | 2/2014 | Ryu et al. | | |

FOREIGN PATENT DOCUMENTS

| | | | |
|---|---|---|---|
| CN | 105226300 | * | 1/2016 |
| JP | 2005-071907 A | | 3/2005 |
| KR | 2006-0034511 A | | 4/2006 |
| KR | 2012-0097312 A | | 9/2012 |
| KR | 140512 B | | 6/2014 |

OTHER PUBLICATIONS

Machine translation of JP 2005-071907 (Year: 2005).*

* cited by examiner

*Primary Examiner* — Sarah A. Slifka
*Assistant Examiner* — Rachel L Zhang
(74) *Attorney, Agent, or Firm* — Knobbe, Martens, Olson & Bear, LLP

(57) ABSTRACT

A secondary battery includes: a main body accommodating an electrode assembly; a sealing part formed along an outer periphery of the main body and including an upwardly bent part; and a circuit board connected to an electrode lead extending outward from the main body and arranged between the main body and the bent part of the sealing part. The secondary battery is suitable for providing a compact structure.

17 Claims, 6 Drawing Sheets

SECONDARY BATTERY

RELATED APPLICATIONS

This application claims the benefit of Korean Patent Application No. 10-2015-0138006, filed on Sep. 30, 2015, in the Korean Intellectual Property Office, the disclosure of which is incorporated herein in its entirety by reference.

BACKGROUND

Field

One or more exemplary embodiments relate to a secondary battery.

Description of the Related Art

Secondary batteries are used in various industrial fields owing to their many advantages. For example, secondary batteries are widely used as energy sources for mobile electronic devices such as digital cameras, cellular phones, and laptop computers. In addition, secondary batteries are used as energy sources for hybrid electric vehicles in order to solve problems such as air pollution caused by internal combustion engine vehicles using fossil fuels such as gasoline and diesel oil.

Along with the development of wireless Internet and communication technology, the use of electronic devices such as cellular phones or portable computers equipped with batteries instead of power supplies has become widespread. In particular, secondary batteries suitable for providing a compact structure for installation in small electronic devices are required.

SUMMARY OF CERTAIN INVENTIVE ASPECTS

One or more exemplary embodiments include a secondary battery suitable for providing a compact structure.

Additional aspects will be set forth in part in the description which follows and, in part, will be apparent from the description, or may be learned by practice of the presented embodiments.

According to one or more exemplary embodiments, a secondary battery includes: a main body accommodating an electrode assembly; a sealing part formed along an outer periphery of the main body and including an upwardly bent part; and a circuit board connected to an electrode lead extending outward from the main body and arranged between the main body and the bent part of the sealing part.

The bent part of the sealing part may face the main body with the circuit board therebetween.

The sealing part may be formed along all sides of the secondary battery surrounding the main body except for a folding-type joint part of the secondary battery.

The sealing part may include a terrace part from which the electrode lead extends outward, and the circuit board may be arranged between the main body and a bent part of the terrace part.

A thermistor may be arranged on the circuit board or the terrace part adjacent to the circuit board so as to measure a temperature of the secondary battery.

The secondary battery may have a hexagonal shape, and the sealing part may be formed along five sides of the secondary battery except for the folding-type joint part.

A main surface of the secondary battery that is largest among surfaces of the secondary battery may have a hexagonal shape.

The main body may have a hexagonal shape.

The folding-type joint part may be located at a side opposite a terrace part from which the electrode lead extends outward.

The terrace part and the folding-type joint part may extend in parallel with each other.

A first side and a second side may be separate from both sides of the terrace part and may extend in a direction substantially perpendicular to the terrace part.

A third side and a fourth side may be arranged between the terrace part and the first and second sides at an oblique angle from the terrace part.

The first and second sides may form longest sides of the secondary battery except for the folding-type joint part.

The third and fourth sides may form shortest sides of the secondary battery.

The circuit board may be arranged in an upright position between the main body and the bent part of the sealing part.

The secondary battery may further include a wiring part connecting the circuit board to an external terminal, and the circuit board and the wiring part may be arranged in an upright position between the main body and different bent parts of the sealing part.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF CERTAIN INVENTIVE EMBODIMENTS

Figure 1:
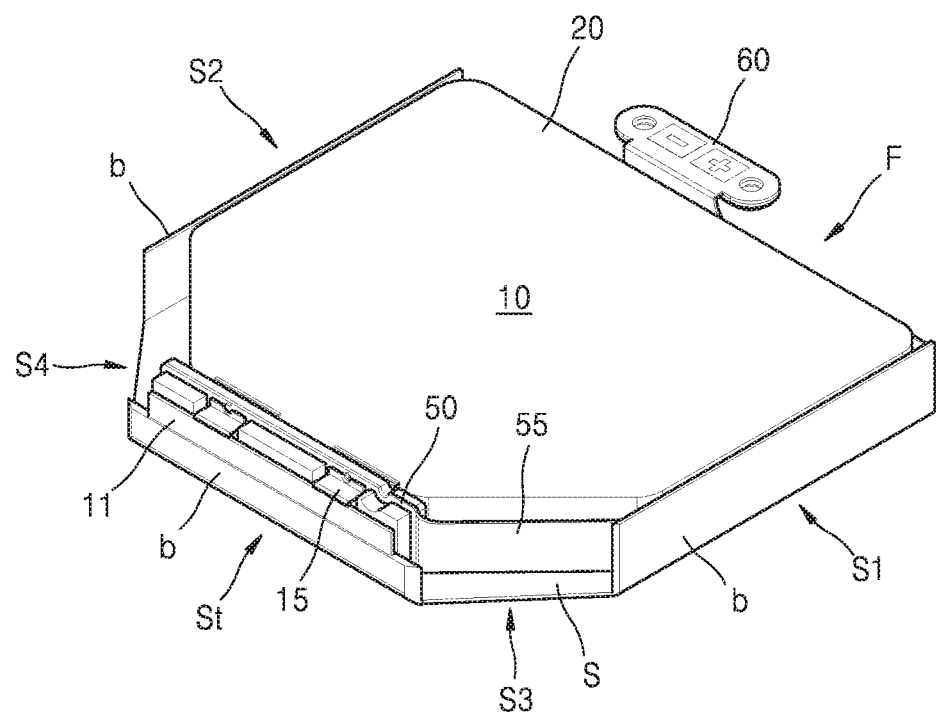
FIG. 1 is a perspective view illustrating a secondary battery according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items.

Hereinafter, secondary batteries will be described with reference to the accompanying drawings, in which exemplary embodiments are shown.

Figure 2:
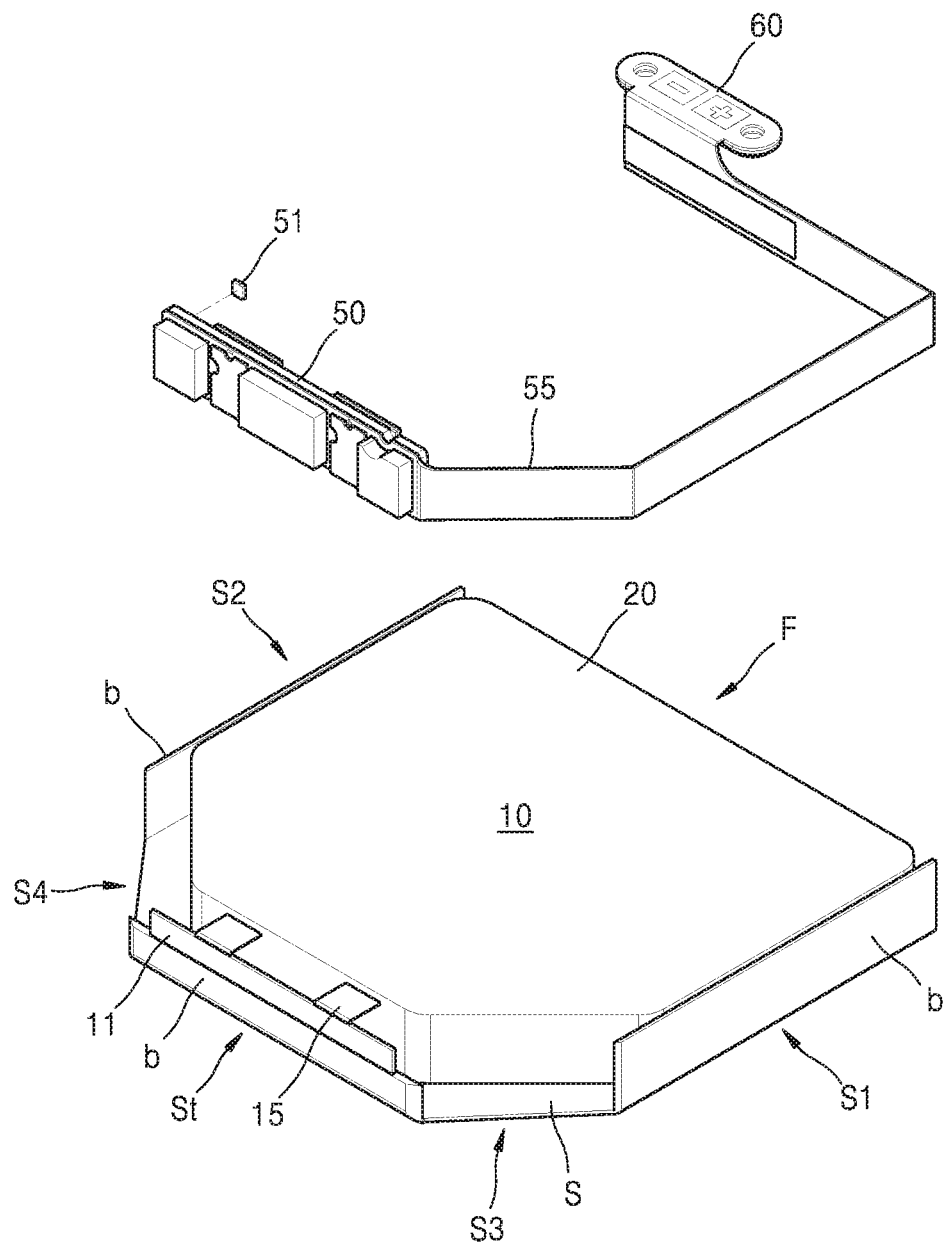
FIG. 2 is an exploded perspective view illustrating the secondary battery depicted in FIG. 1.
Figure 3:
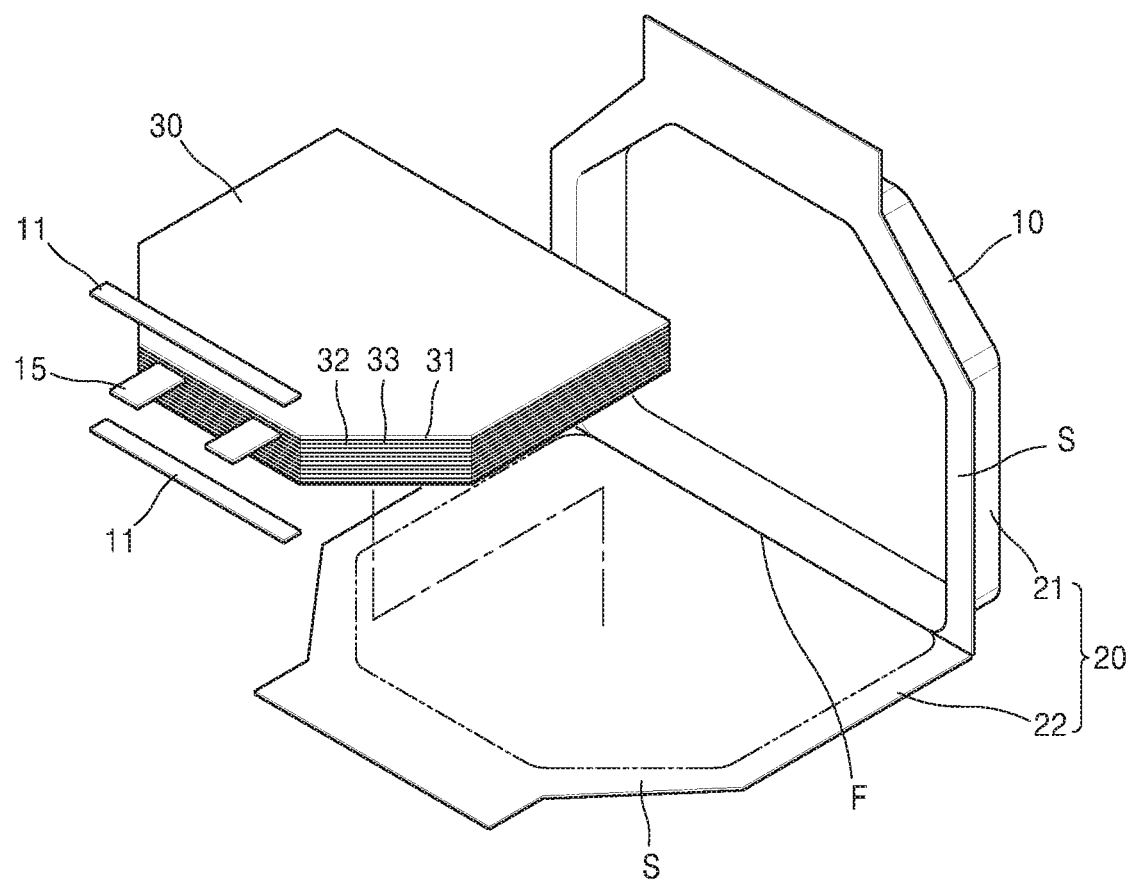
FIG. 3 is an exploded perspective view illustrating an electrode assembly of the secondary battery depicted in FIG. 2.

FIG. 1 is a perspective view illustrating a secondary battery according to an exemplary embodiment. FIG. 2 is an exploded perspective view illustrating the secondary battery depicted in FIG. 1. FIG. 3 is an exploded perspective view illustrating an electrode assembly 30 of the secondary battery depicted in FIG. 2.

Referring to FIGS. 1 to 3, the secondary battery has a polygonal shape. For example, a main surface of the secondary battery that is the largest surface among surfaces of the secondary battery may have a polygonal shape. In the exemplary embodiment, the secondary battery may have a hexagonal shape. As described later, an upwardly bent part (b) may be formed on a terrace part St from which electrode leads 15 extend outward, and a circuit board 50 may be disposed between the bent part (b) of the terrace part St and a main body 10 of the secondary battery. In this case, since the secondary battery has a polygonal shape, the bent part (b) of the terrace part St may not physically interfere with bent parts (b) of first and second sides S1 and S2.

In the exemplary embodiment, a sealing part S may be formed along an outer periphery of the secondary battery. That is, upwardly bent parts (b) may be formed along the outer periphery of the secondary battery except for an edge along which a folding-type joint part F is formed. Thus, the secondary battery may have a polygonal shape so that the terrace part St may be bent without interference with other parts. This will be described later.

The secondary battery may include: the main body 10 accommodating the electrode assembly 30; the sealing part S formed along the outer periphery of the main body 10 and including the upwardly bent parts (b); and the circuit board 50 disposed between the main body 10 and a bent part (b) of the sealing part S and connected to the electrode leads 15 extending from the main body 10.

The main body 10 of the secondary battery may refer to a part of the secondary battery in which the electrode assembly 30 is accommodated. As described later, the main body 10 of the secondary battery may include the electrode assembly 30 and a case 20 accommodating the electrode assembly 30. In other words, the secondary battery may include the main body 10 accommodating the electrode assembly 30, and the sealing part S forming the outer periphery of the main body 10.

Referring to FIG. 3, the main body 10 may accommodate the electrode assembly 30. The main body 10 may have a polygonal shape. In the exemplary embodiment, the main body 10 may have a hexagonal shape. The electrode assembly 30 may be a stacked-type electrode assembly in which first and second electrode plates 31 and 32 having different polarities are stacked with separators 33 being disposed therebetween. For example, the first and second electrode plates 31 and 32 and the separators 33 may have a hexagonal sheet shape, and thus the electrode assembly 30 formed of the first and second electrode plates 31 and 32 and the separators 33 may have a hexagonal shape.

In another exemplary embodiment, the electrode assembly 30 may be a roll-type electrode assembly in which a stack of first and second electrode plates 31 and 32 having different polarities and a separator 33 disposed therebetween is wound in the form of a jelly-roll.

The main body 10 of the secondary battery may include the electrode assembly 30 and the case 20 accommodating the electrode assembly 30. The case 20 may include a first case 21 and a second case 22, and the first and second cases 21 and 22 may be joined together along the folding-type joint part F in mutually facing directions with the electrode assembly 30 being disposed therebetween. Although not shown, the case 20 may be a flexible pouch formed of a thin metallic plate and insulative resin sheets disposed on both sides of the thin metallic plate.

For example, sealing portions S formed along the outer peripheries of the first and second cases 21 and 22 may be joined together in mutually facing directions so as to seal the case 20 accommodating the electrode assembly 30. For example, the sealing portions S of the first and second cases 21 and 22 may be joined together by a thermal pressing method. In other words, the sealing part S may be formed by joining remaining portions of the case 20 accommodating the electrode assembly 30.

The electrode leads 15 may extend outward between the first and second cases 21 and 22, and the first and second cases 21 and 22 may be joined together by a thermal pressing method in a state in which the electrode leads 15 are disposed between the first and second cases 21 and 22. In this case, sealing members 11 may be disposed between the electrode leads 15 and the first and second cases 21 and 22.

The sealing part S may be formed along the outer periphery of the main body 10. For example, the sealing part S may be formed along the outer periphery of the main body 10 except for the folding-type joint part F. In addition, the sealing part S may include the upwardly bent parts (b).

Referring to FIG. 2, the secondary battery may further include the circuit board 50 electrically connected to the electrode leads 15. For example, the circuit board 50 may control charging and discharging operations of the secondary battery, and if the circuit board 50 detects an abnormal operation of the secondary battery such as overcharging, overdischarging, overheating, or the occurrence of an overcurrent, the circuit board 50 may take action such as stopping the charging or discharging operation of the secondary battery, thereby protecting the secondary battery.

If the circuit board 50 detects overheating of the secondary battery, the circuit board 50 may take action to protect the secondary battery. To this end, the circuit board 50 may include a thermistor 51 to obtain information about the temperature of the secondary battery. In the exemplary embodiment, the circuit board 50 is disposed between the bent part (b) of the terrace part St and the main body 10 of the secondary battery, the circuit board 50 may measure the temperature of the secondary battery without thermal loss. For example, the terrace part St from which the electrode leads 15 extend outward has a relatively high temperature, and since the circuit board 50 is covered with the bent part (b) of the terrace part St, the circuit board 50 may measure the temperature of the secondary battery without thermal loss. As a result, according to the exemplary embodiment, overheating of the secondary battery may be more accurately detected without thermal loss. That is, since it is possible to detect overheating of the secondary battery with less failure, accidents such as explosions or fires may be prevented.

The circuit board 50 may be disposed between the bent part (b) of the terrace part St and the main body 10 of the secondary battery. In this case, the circuit board 50 may be disposed in an upright position. That is, instead of laying the circuit board 50 on its main surface, the circuit board 50 is disposed in an upright position exactly or nearly aligned with a vertical line. Here, the expression "the circuit board 50 is disposed in an upright position" means that the circuit board 50 is disposed such that the main surface of the circuit board 50 is vertical or nearly vertical.

If the circuit board 50 is disposed as described above, a space for disposing the circuit board 50 may be saved, and the secondary battery may have a compact structure. That is, if the circuit board 50 is disposed in an upright position exactly or nearly aligned in a vertical direction, a narrow space between the bent part (b) of the terrace part St and the main body 10 of the secondary battery may be used to insert the circuit board 50 therein, and thus the secondary battery may have a compact structure.

A wiring part 55 may be connected to the circuit board 50. The wiring part 55 may electrically connect the circuit board 50 to an external device (not shown) such as a load or a charger. In other words, the wiring part 55 may connect the circuit board 50 to an external terminal 60.

The wiring part 55 may extend from the circuit board 50 toward the folding-type joint part F around the main body 10 of the secondary battery. That is, the wiring part 55 extend from the circuit board 50 disposed on the terrace part St toward the folding-type joint part F opposite the terrace part St along a third side S3 and the first side S1. For example, a portion of the wiring part 55 may be disposed between a bent part (b) of the first side S1 and the main body 10 of the secondary battery. Since the portion of the wiring part 55 is disposed between the bent part (b) of the first side S1 and the main body 10 of the secondary battery, the wiring part 55 may be properly guided and protected from environmental agents.

The wiring part 55 may be connected to the external terminal 60 at a position adjacent the folding-type joint part F. The external terminal 60 may be connected to an external load (not shown) to supply a discharge current to the external load or may be connected to an external charger (not shown) to receive a charge current from the external charger. The wiring part 55 may include at least two conductive patterns (not shown) electrically insulated from each other.

Like the circuit board 50, the wiring part 55 may be disposed in an upright position exactly or nearly aligned with a vertical line. That is, instead of laying the wiring part 55 on its main surface, the wiring part 55 is disposed in an upright position exactly or nearly aligned with a vertical line. If the wiring part 55 is disposed as described above, a space for disposing the wiring part 55 may be saved, and the secondary battery may have a compact structure.

The circuit board 50 and the wiring part 55 may be disposed in an upright position between the main body 10 and different bent parts (b) of the sealing part S. For example, the circuit board 50 may be disposed in an upright position between the main body 10 and the bent part (b) of the terrace part St, and the wiring part 55 may be disposed in an upright position between the main body 10 and the bent part (b) of the first side S1.

Figure 4:
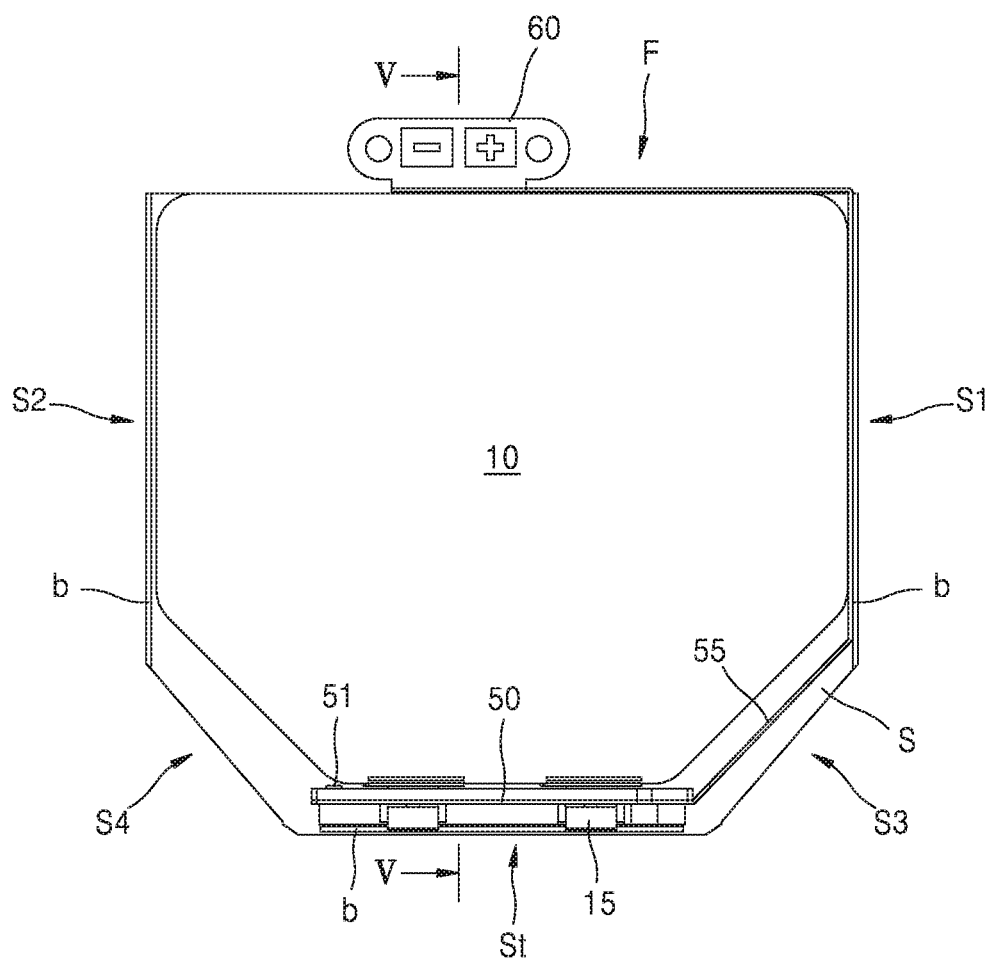
FIG. 4 is a plan view illustrating the secondary battery depicted in FIG. 1.
Figure 5:
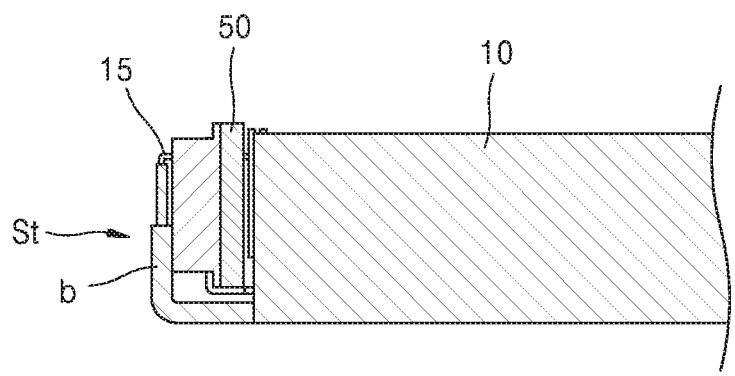
FIG. 5 is a cross-sectional view taken along a line V-V of FIG. 4.

FIG. 4 is a plan view illustrating the secondary battery depicted in FIG. 1. FIG. 5 is a cross-sectional view taken along a line V-V of FIG. 4.

Referring to FIG. 4, the main surface of the secondary battery may have a hexagonal shape. Therefore, the secondary battery may include six sides. The six sides of the secondary battery may include: the terrace part St from which the electrode leads 15 extend outward; the first and second sides S1 and S2 extending in a direction substantially perpendicular to the terrace part St; and third and fourth sides S3 and S4 extending from both sides of the terrace part St at an oblique angle. For example, the first and second sides S1 and S2 may form sides of the main surface of the secondary battery which are longest except for a side where the folding-type joint part F is located. For example, the third and fourth sides S3 and S4 may form the shortest sides of the main surface of the secondary battery.

The folding-type joint part F may extend in parallel with the terrace part St. The sealing part S may not be formed on the side of the main surface of the secondary battery where the folding-type joint part F is located. In other words, the sealing part S may be formed along the terrace part St and the first to fourth sides S1 to S4 except for the folding-type joint part F. The sealing part S may have an upwardly bent shape. The circuit board 50 may be disposed between the bent part (b) of the terrace part St and the main body 10 of the secondary battery.

In the exemplary embodiment, the sealing part S may include the upwardly bent parts (b) formed on the terrace part St and the first and second sides S1 and S2. In another exemplary embodiment, however, bent parts may also be formed on the third and fourth sides S3 and S4.

The terrace part St may be bent without interfering with bent parts (b) of the first and second sides S1 and S2. For example, the first and second sides S1 and S2 substantially perpendicular to the terrace part St are not in contact with the terrace part St, and the third and fourth sides S3 and S4 are located between the terrace part St and the first and second sides S1 and S2. That is, the terrace part St which is perpendicular to the first and second sides S1 and S2 is not in contact with the first and second sides S1 and S2, and the third and fourth sides S3 and S4 are obliquely located between the terrace part St and the first and second sides S1 and S2. Thus, bending of the terrace part St and the first and second sides S1 and S2 may be smoothly carried out without interference therebetween.

The secondary battery may further include the circuit board 50 electrically connected to the electrode leads 15. For example, the circuit board 50 may control charging and discharging operations of the secondary battery, and if the circuit board 50 detects an abnormal operation of the secondary battery such as overcharging, overdischarging, overheating, or the occurrence of an overcurrent, the circuit board 50 may take action such as stopping the charging or discharging operation of the secondary battery so as to protect the secondary battery.

In the exemplary embodiment, the circuit board 50 may be disposed between the bent part (b) of the terrace part St and the main body 10 of the secondary battery. The bent part (b) of the terrace part St may refer to an upwardly bent portion of the terrace part St.

Referring to FIG. 5, the bent part (b) of the terrace part St and the main body 10 may be separate from each other and may face with each other. In this state, the circuit board 50 may be disposed between the bent part (b) of the terrace part St and the main body 10 of the secondary battery. The circuit board 50 may perform protective operations for the secondary battery and may include a plurality of circuit devices. Although an additional protective member is not provided for the circuit board 50, the circuit board 50 may be protected by the bent part (b) of the terrace part St. That is, since the circuit board 50 is disposed between the bent part (b) of the terrace part St and the main body 10 of the secondary battery, the circuit board 50 may be protected from environmental agents.

Figure 6:
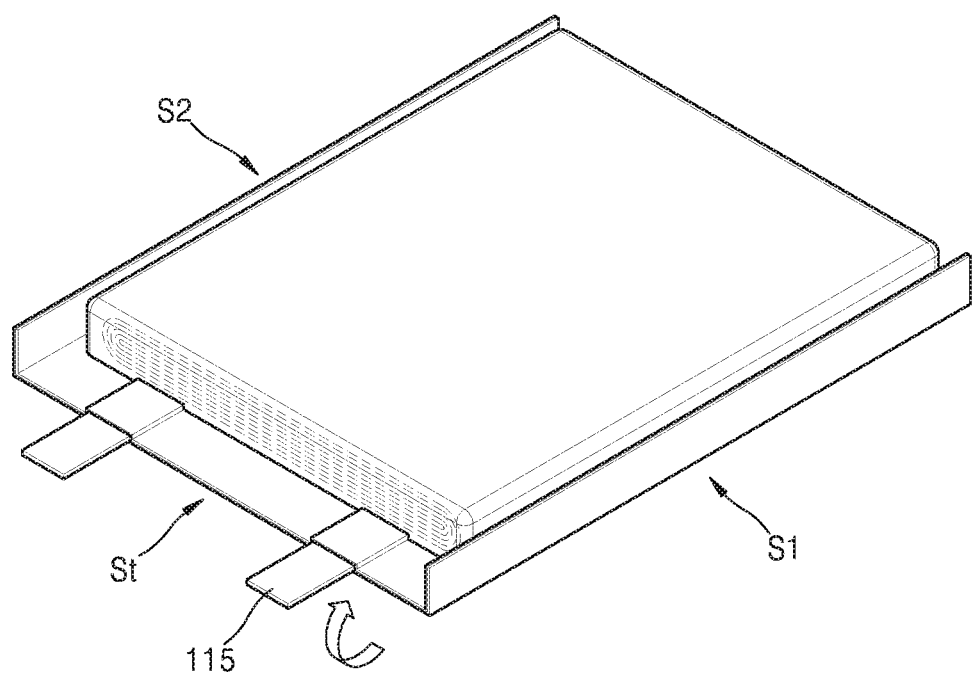
FIG. 6 is a view illustrating a secondary battery as a comparative example for comparing with the secondary battery of the present exemplary embodiment.

FIG. 6 is a view illustrating a secondary battery as a comparative example for comparing with the secondary battery of the present exemplary embodiment. Referring to FIG. 6, the secondary battery has a tetragonal shape, and a terrace part St from which electrode leads 115 extend outward meets first and second sides S1 and S2 at a right angle. In this case, bending of the terrace part St may interfere with bent parts of the first and second sides S1 and S2. That is, if the terrace part St is bent after the first and second sides S1 and S2 are bent, bending of the terrace part St may interfere with bent parts of the first and second sides S1 and S2, and if the first and second sides S1 and S2 are bent after the terrace part St is bent, bending of the first and second sides S1 and S2 may interfere with a bent part of the terrace part St. Therefore, it may be difficult to bend all the terrace part St and the first and second sides S1 and S2.

However, according to the polygonal shape of the secondary battery of the exemplary embodiment, the terrace part St which is perpendicular to the first and second sides S1 and S2 is not in contact with the first and second sides S1 and S2, and the third and fourth sides S3 and S4 are obliquely located between the terrace part St and the first and second sides S1 and S2. Thus, bending of the terrace part St and the first and second sides S1 and S2 may be smoothly carried out without physical interference therebetween. In this regard, when the secondary battery or the main body 10 of the secondary battery is referred to as having a polygonal shape, the polygonal shape may be a shape having six or more sides.

Figure 7:
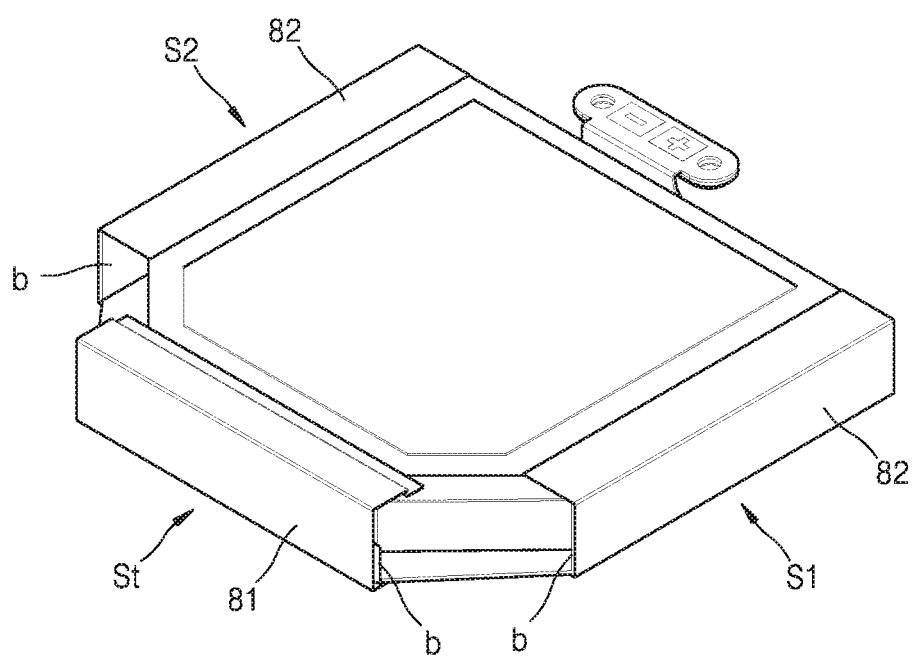
FIG. 7 is a view illustrating a secondary battery according to another exemplary embodiment.

FIG. 7 is a view illustrating a secondary battery according to another exemplary embodiment.

Referring to FIG. 7, insulative members 81 and 82 may be disposed on a terrace part St and first and second sides on which upwardly bent parts (b) are formed. The insulative members 81 and 82 may cover thin metallic plates (not shown) exposed at ends of the bent parts (b). In addition, the insulative members 81 and 82 may maintain the shapes of the bent parts (b), and thus a circuit board 50 and a wiring part 55 disposed between the bent parts (b) and a main body 10 of the secondary battery may be stably fixed.

As described above, according to the one or more of the above exemplary embodiments, since the secondary battery has a polygonal shape such as a hexagonal shape, the terrace part from which the electrode leads extend outward may be smoothly bent. In addition, since the circuit board is compactly disposed using the bent part of the terrace part, the secondary battery may have a small size, and elements of the secondary battery such as the circuit board may be stably protected. Furthermore, since the thermistor is disposed on the circuit board covered with the bent part of the terrace part, thermal loss through the thermistor may be minimized, and thus the temperature of the secondary battery may be more accurately measured.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A secondary battery comprising:
a case comprising:
   a main body defining an interior configured to accommodate an electrode assembly, the electrode assembly having a thickness defined in a first direction, and
   a sealing part formed along an outer periphery of the main body and comprising an upwardly bent part extending in a second direction substantially parallel to the first direction, wherein the sealing part comprises a terrace part from which an electrode lead extends outward and first and second sides formed on opposing sides of the main body, and wherein the electrode lead extends outward from a surface of the main body;
a circuit board connected to the electrode lead and arranged outside of the interior of the main body and between the main body and the bent part, wherein the bent part faces the surface of the main body;
an external terminal formed on an opposing side of the main body with respect to the circuit board and electrically connected to the circuit board, the external terminal extending from the main body in a third direction substantially perpendicular to the first and second directions; and
a pair of sealing members formed on opposing sides of the electrode lead and interposed between the electrode lead and the sealing part,
wherein the pair of sealing members are formed at least partially within the bent part,
wherein the sealing part is not formed along a folding-type joint part of the main body,
wherein the folding-type joint part is parallel to the terrace part and the folding-type joint part and the terrace part are formed on opposing sides of the main body,
wherein a length of the folding-type joint part is greater than lengths of each of the terrace part and the first and second sides,
wherein the external terminal is formed adjacent to the folding-type joint part and on an opposing side of the main body with respect to the terrace part, and
wherein the external terminal is arranged to be substantially flat along the third direction and the circuit board is arranged to be substantially flat along the first direction.

2. The secondary battery of claim 1, wherein the bent part of the sealing part and the surface of the main body from which the electrode lead extends are perpendicular to a bottom surface of the circuit board.

3. The secondary battery of claim 1, wherein the sealing part is formed along all sides of the secondary battery surrounding the main body except for the folding-type joint part.

4. The secondary battery of claim 3, wherein a thermistor is arranged on the circuit board or the terrace part adjacent to the circuit board so as to measure a temperature of the secondary battery.

5. The secondary battery of claim 3, wherein the secondary battery has a hexagonal shape, and
the sealing part is formed along five sides of the secondary battery except for the folding-type joint part.

6. The secondary battery of claim 5, wherein a main surface of the secondary battery that is largest among surfaces of the secondary battery has a hexagonal shape.

7. The secondary battery of claim 5, wherein the main body has a hexagonal shape.

8. The secondary battery of claim 5, wherein the first side and the second side extend in a direction substantially perpendicular to the terrace part.

9. The secondary battery of claim 8, wherein a third side and a fourth side are arranged between the terrace part and the first and second sides at an oblique angle from the terrace part.

10. The secondary battery of claim 9, wherein the first and second sides form longest sides of the secondary battery except for the folding-type joint part.

11. The secondary battery of claim 9, wherein the third and fourth sides form shortest sides of the secondary battery.

12. The secondary battery of claim 1, wherein the circuit board is arranged in an upright position between the main body and the bent part of the sealing part.

13. The secondary battery of claim 1, further comprising a wiring part connecting the circuit board to the external terminal, wherein the circuit board and the wiring part are arranged in an upright position between the main body and different bent parts of the sealing part.

14. A secondary battery comprising:

a case comprising:

a main body defining an interior configured to accommodate an electrode assembly, the electrode assembly having a thickness defined in a first direction, and a sealing part formed along the periphery of the main body and comprising a plurality of upwardly bent parts, a first one of the upwardly bent parts extending in a second direction substantially parallel to the first direction, wherein the sealing part comprises a terrace part from which an electrode lead extends outward and first and second sides formed on opposing sides of the main body, and wherein the electrode lead extends outward from a surface of the main body;

a circuit board connected to the electrode lead and arranged outside of the interior of the main body and between the main body and a first upwardly bent part of the sealing part, wherein the plurality of upwardly bent parts include at least the first upwardly bent part and a second upwardly bent part that are spaced apart from each other by a portion of the sealing part that is not upwardly bent, wherein the first upwardly bent part of the sealing part faces the surface of the main body from which the electrode lead extends;

an external terminal formed on an opposing side of the main body with respect to the circuit board and electrically connected to the circuit board, the external terminal extending from the main body in a third direction substantially perpendicular to the first and second directions; and a pair of sealing members formed on opposing sides of the electrode lead and interposed between the electrode lead and the sealing part, wherein the pair of sealing members are formed at least partially within the first upwardly bent part, wherein the sealing part is not formed along a folding-type joint part of the main body, wherein the folding-type joint part is parallel to the terrace part and the folding-type joint part and the terrace part are formed on opposing sides of the main body, wherein a length of the folding-type joint part is greater than lengths of each of the terrace part and the first and second sides, wherein the external terminal is formed adjacent to the folding-type joint part and on an opposing side of the main body with respect to the terrace part, and wherein the external terminal is arranged to be substantially flat along the third direction and the circuit board is arranged to be substantially flat along the first direction.

15. The secondary battery of claim 14, wherein the main body defines a hexagonal shape and the plurality of upwardly bent parts further include a third upwardly bent part and wherein the first upwardly bent part is separated from the second and third upwardly bent parts by first and second edges of the hexagonal sealing part that are not bent.

16. The secondary battery of claim 15, wherein the circuit board is positioned on the terrace part so as to be interposed between the first bent part and the main body.

17. The secondary battery of claim 16, wherein the folding part does not have a sealing part attached thereto.

* * * * *